United States Patent
Lai

(10) Patent No.: US 9,625,957 B1
(45) Date of Patent: Apr. 18, 2017

(54) TOOL-FREE FASTENING DEVICE FOR A GLASS SIDE PANEL OF COMPUTER

(71) Applicant: IN WIN DEVELOPMENT, INC., Taoyuan Hsien (TW)

(72) Inventor: Wen-Hsien Lai, Taoyuan Hsien (TW)

(73) Assignee: IN WIN DEVELOPMENT, INC., Taoyuan Hsien (TW)

( * ) Notice: Subject to any disclaimer, the term of this patent is extended or adjusted under 35 U.S.C. 154(b) by 0 days.

(21) Appl. No.: 15/081,568

(22) Filed: Mar. 25, 2016

(51) Int. Cl.
*A47B 81/00* (2006.01)
*G06F 1/18* (2006.01)

(52) U.S. Cl.
CPC .................... *G06F 1/183* (2013.01)

(58) Field of Classification Search
CPC ................ G06F 1/183; G06F 1/181
USPC .................... 312/223.2; 361/679.6
See application file for complete search history.

(56) References Cited

U.S. PATENT DOCUMENTS

| | | | | |
|---|---|---|---|---|
| 5,831,822 A * | 11/1998 | Hulick | ............... | G06F 1/183 361/679.48 |
| 6,542,356 B2 * | 4/2003 | Gan | ............... | G06F 1/181 312/223.2 |
| 6,775,144 B2 * | 8/2004 | Gan | ............... | G06F 1/181 312/223.1 |
| 7,672,124 B2 * | 3/2010 | Zhang | ............... | G06F 1/181 361/679.57 |
| 7,722,137 B2 * | 5/2010 | Li | ............... | G06F 1/181 312/223.2 |
| 7,894,186 B2 * | 2/2011 | Farrow | ............... | E05B 65/006 361/679.57 |
| 8,054,623 B2 * | 11/2011 | Mariano | ............... | G06F 1/181 361/679.02 |
| 8,405,980 B2 * | 3/2013 | Hsu | ............... | G06F 1/181 361/679.02 |
| 8,632,140 B2 * | 1/2014 | Chen | ............... | G06F 1/181 312/223.2 |
| 8,864,248 B2 * | 10/2014 | Yang | ............... | G06F 1/181 312/205 |
| 2003/0011972 A1 * | 1/2003 | Koo | ............... | G06F 1/1616 361/679.27 |
| 2004/0240169 A1 * | 12/2004 | Wu | ............... | G06F 1/183 361/679.33 |
| 2006/0226743 A1 * | 10/2006 | Chen | ............... | G06F 1/181 312/223.2 |
| 2008/0179150 A1 * | 7/2008 | Tracy | ............... | F16F 15/08 188/378 |
| 2012/0099271 A1 * | 4/2012 | Hsu | ............... | G06F 1/181 361/679.58 |
| 2014/0361671 A1 * | 12/2014 | Degner | ............... | G06F 3/00 312/223.2 |

* cited by examiner

*Primary Examiner* — Hanh V Tran
(74) *Attorney, Agent, or Firm* — Pro-Techtor International Services; Ian Oglesby

(57) ABSTRACT

The present invention discloses a tool-free fastening device for a glass side panel of computer. A glass side panel at an end of the computer is provided with a movable handle, an interior of the computer is provided with a movable plate, and the glass side panel is fixed on the computer by locking lock hooks on the movable handle into through-holes of the movable plate for positioning. When the glass side panel is to be dismantled from the computer, only the movable handle needs to be pressed to displace the movable plate, and then the glass side panel can be unlocked and release from the computer.

3 Claims, 6 Drawing Sheets

TOOL-FREE FASTENING DEVICE FOR A GLASS SIDE PANEL OF COMPUTER

BACKGROUND OF THE INVENTION a) Field of the Invention

The present invention relates to a device that can be used to dismantle or install a glass side panel of computer successfully without using screws.

b) Description of the Prior Art

A conventional side panel of computer is fixed on a side of the computer with screws. Therefore, a tool such as screw driver has to be used when the side panel is to be dismantled or installed. However, in addition to requiring labor work and time upon dismantling or installing the side panel, the operation cost of the product itself will increase. Furthermore, most of the related industries will drill holes on the glass side panel and lock the glass side panel with screws, which damages the strength of the glass side panel itself and provides no protection to edges and corners of the glass side panel. All of the above factors will result in the risk of shattering the glass side panel during operation and the shattering of the glass side panel will induce a safety issue to the operators. Hence, there is a need for improvement in the heat dissipating device.

SUMMARY OF THE INVENTION

Accordingly, the primary object of the present invention is to provide a tool-free fastening device for a glass side panel of computer, allowing the glass side panel to be fixed on the computer without using screws. When the glass side panel is to be dismantled for repairing or replacing internal parts of the computer, only a movable handle on a top end of the glass side panel needs to be pressed, displacing a movable plate in the computer. The glass side panel can then be tilted outward and opened, thereby being dismantled from the computer quickly.

To enable a further understanding of the said objectives and the technological methods of the invention herein, the brief description of the drawings below is followed by the detailed description of the preferred embodiments.

BRIEF DESCRIPTION OF THE DRAWINGS

FIG. 7-1 shows a planar schematic view of a movable plate of the present invention.

DETAILED DESCRIPTION OF THE PREFERRED EMBODIMENTS

Figure 1:
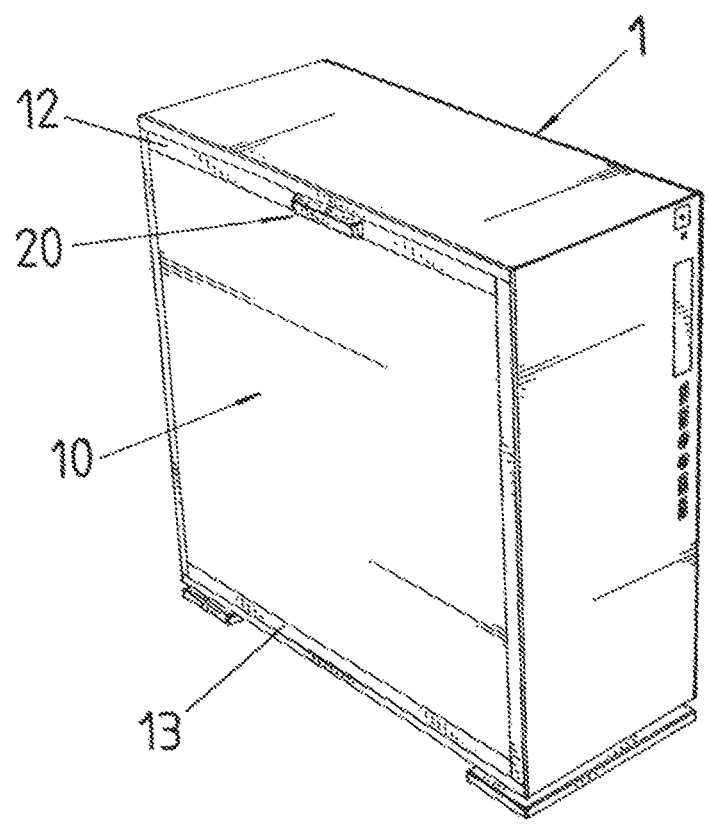
FIG. 1 shows a schematic view of an appearance of the present invention.
Figure 2:
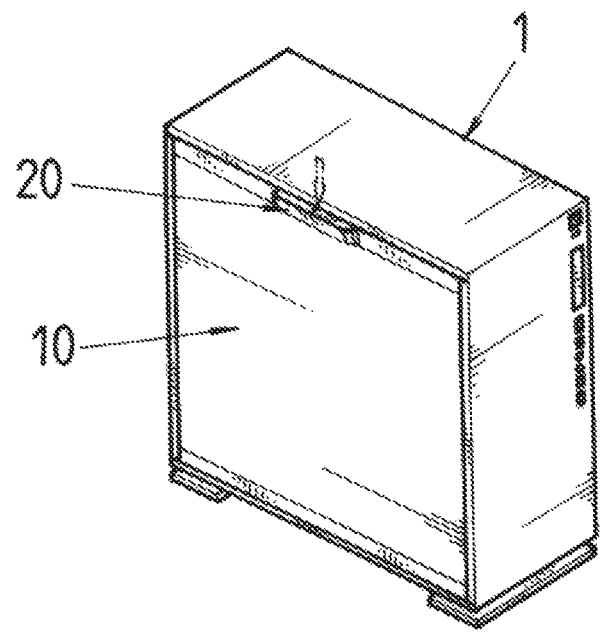
FIG. 2 shows an schematic view of an appearance upon pressing movable handle of the present invention.
Figure 3:
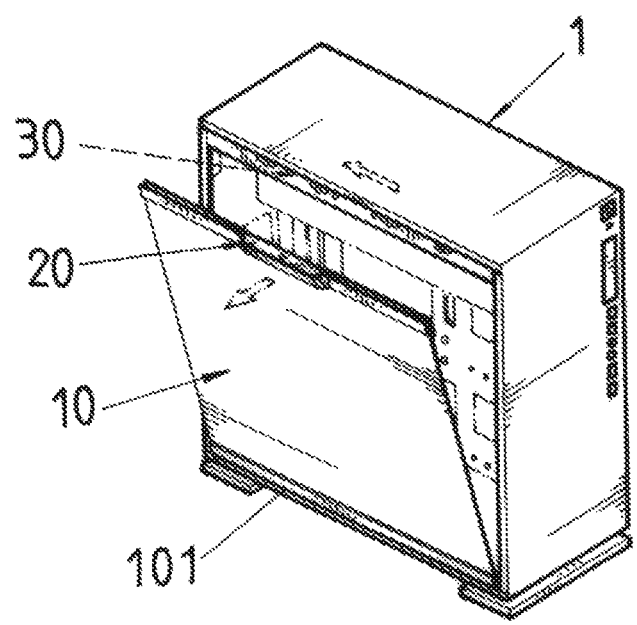
FIG. 3 shows a schematic view of an implementation upon disassembling a glass side panel of the present invention.

Referring to FIG. 1, a side of a computer 1 is installed with a transparent glass side panel 10. A bottom end of the glass side panel 10 is directly latched in a bottom plate 101 (as shown in FIG. 1) of the computer 1. Referring to FIG. 2, when the glass side panel 10 is to be dismantled for repairing or replacing internal parts of the computer 1, only a movable handle 20 on a top end of the glass side panel 10 needs to be pressed. Referring to FIG. 3, the movable handle 20 is pressed for unlocking like a press-button, displacing a movable plate 30 toward a side. Therefore, the glass side panel 10 can be tilted outward and opened along a direction indicated by the arrow, thereby being dismantled from the computer 1 quickly.

When the glass side panel 10 is to be installed, a lower end thereof should be positioned first, and then the movable handle 20 on an upper end thereof as well as the glass side panel 10 are put on a bottom seat of the computer 1. Lock hooks 24 of the movable handle 20 on an interior side of plastic elements 12 on the upper end of the glass side panel 10 touch the movable plate 30 and displace the movable plate 30 to a certain stroke; when the glass side panel 10 is closed completely, it can be locked and fixed automatically.

Furthermore, the plastic elements 12, 13 on the upper and lower end of the glass side panel 10 protect edges and corners of the glass side panel 10, which reduces significantly the probability of shattering of the glass side panel 10 by collision during operation. As the plastic elements 12, 13 and the glass side panel 10 are combined by gluing, there is no need to use the conventional way of drilling holes on the glass side panel 10 and then fixing the glass side panel 10, which improves greatly the strength of the glass side panel 10 itself. All of the above factors will improve the safety of the operators.

Figure 4:
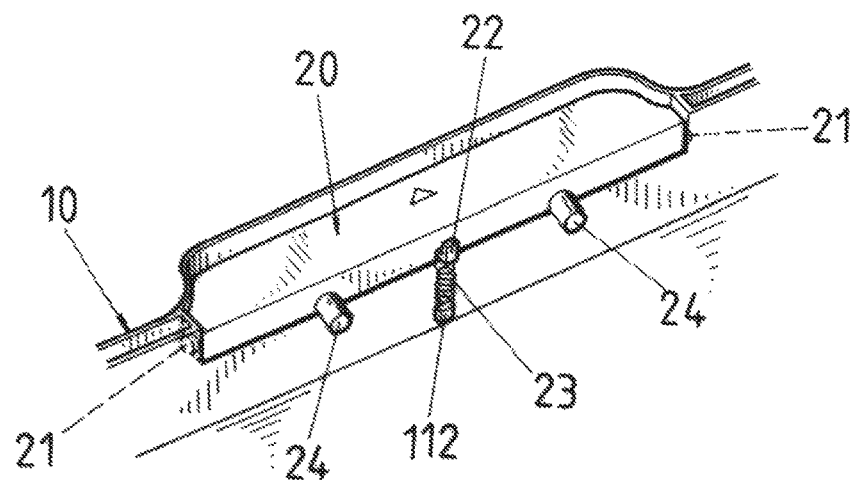
FIG. 4 shows an assembled view of a glass side panel combined with a movable handle of the present invention.
Figure 5:
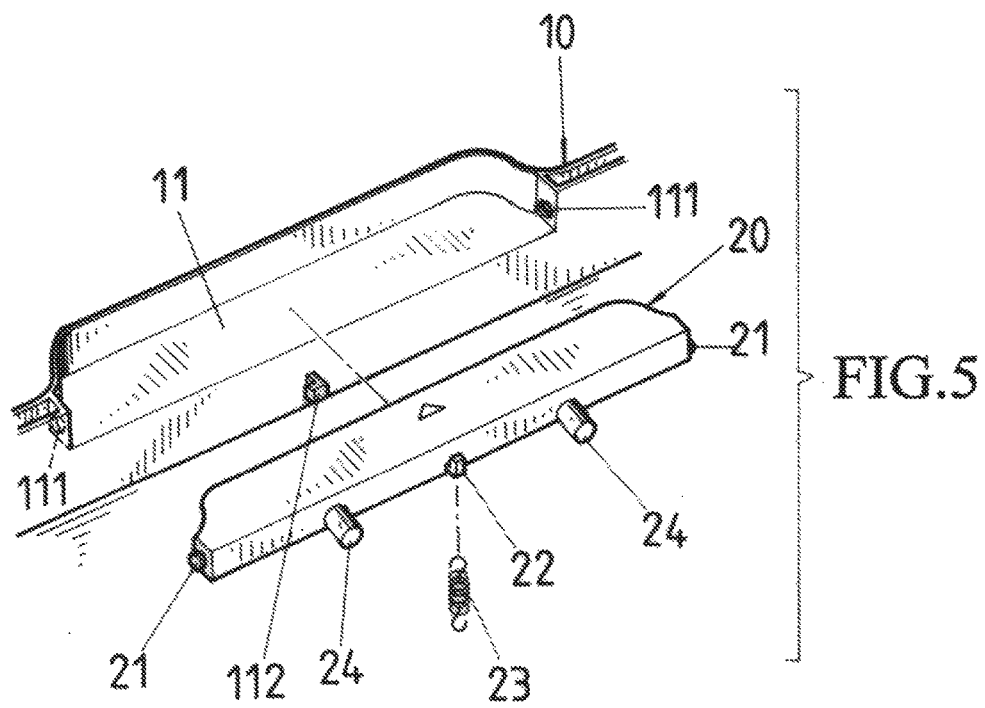
FIG. 5 an exploded view of a glass side panel combined with a movable handle of the present invention.

Referring to FIG. 4 and FIG. 5, it shows structural views of the glass side panel 10 and the movable handle 20. A groove 11 is disposed near a central location on a top end of the glass side panel 10, allowing the movable handle 20 to be put in. Two ends of the groove 11 are provided respectively with a lock hole 111, and a lower side of the groove 11 is provided with a spring hook 112. Two ends of the movable handle 20 are provided respectively with a lock block 21 which can be locked into the lock hole 111 of the groove 11 for positioning. A spring hook 22 is disposed near a central location on an interior side of the movable handle 20, and an end of a spring 23 is hooked on the spring hook 22; whereas, the other end of the spring 23 is hooked on the spring hook 112 of the glass side panel 10. On an interior side of the movable handle 20, two ends of the spring hook 22 are provided respectively with a lock hook 24.

Figure 6:
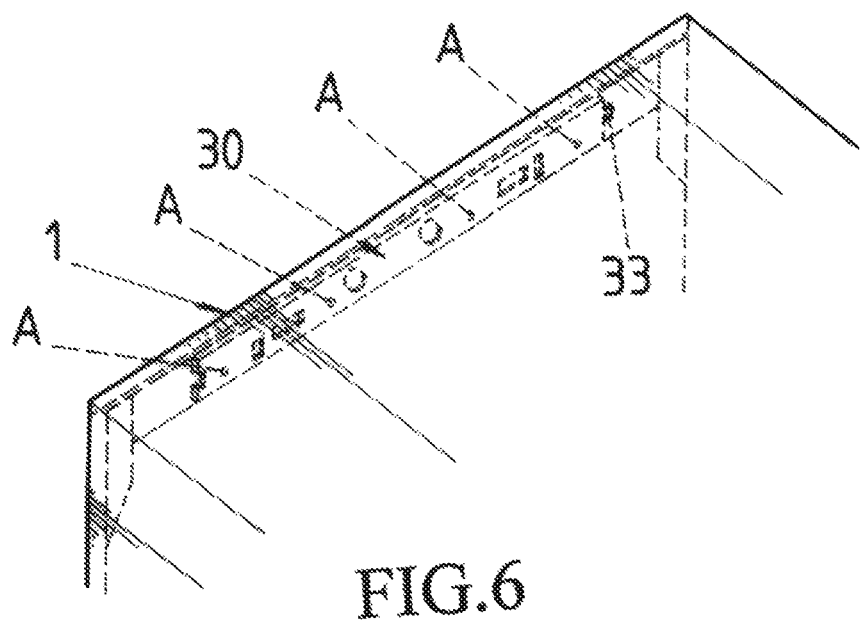
FIG. 6 shows an assembled view of a computer combined with a movable plate of the present invention.
Figure 7:
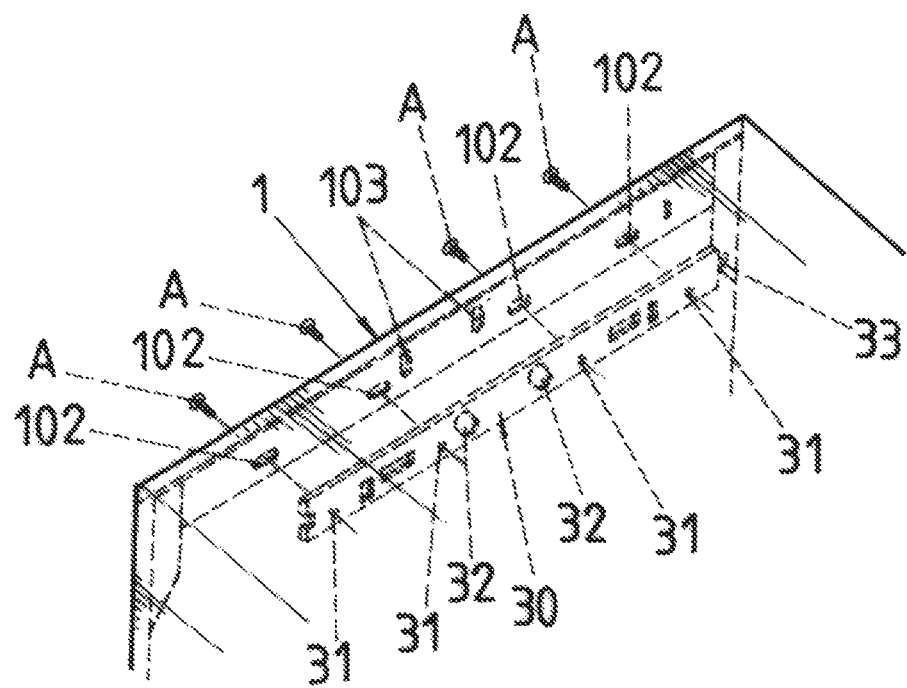
FIG. 7 shows an exploded view of a computer and a movable plate of the present invention.
Figures 1, 7:
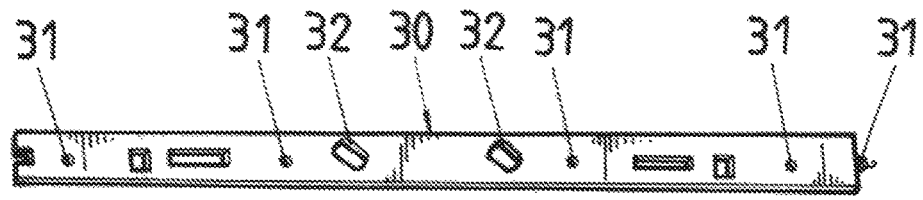

Referring to FIG. 6 and FIG. 7, it shows structural views of the computer 1 and the movable plate 30. For the computer 1, the top end of the glass side panel 10 is provided with at least a long hole 102 and two perforations 103. At least a lock hole 31 is disposed at an end of the movable plate 30 corresponding to the long hole 101, and at least a screw A penetrates into the long hole 102 of the computer 1 and is then locked into the lock hole 31 of the movable plate 30 for positioning. Referring to FIG. 7-1, two through-holes 32 are disposed at a central location of the movable plate 30, and the two through-holes 32 are slant and rectangular. A side of the movable plate 30 is hooked with a restoring spring 33 and the other end of the restoring spring 33 is hooked on a hook column of the computer 1 (not shown in the drawings).

Figure 8:
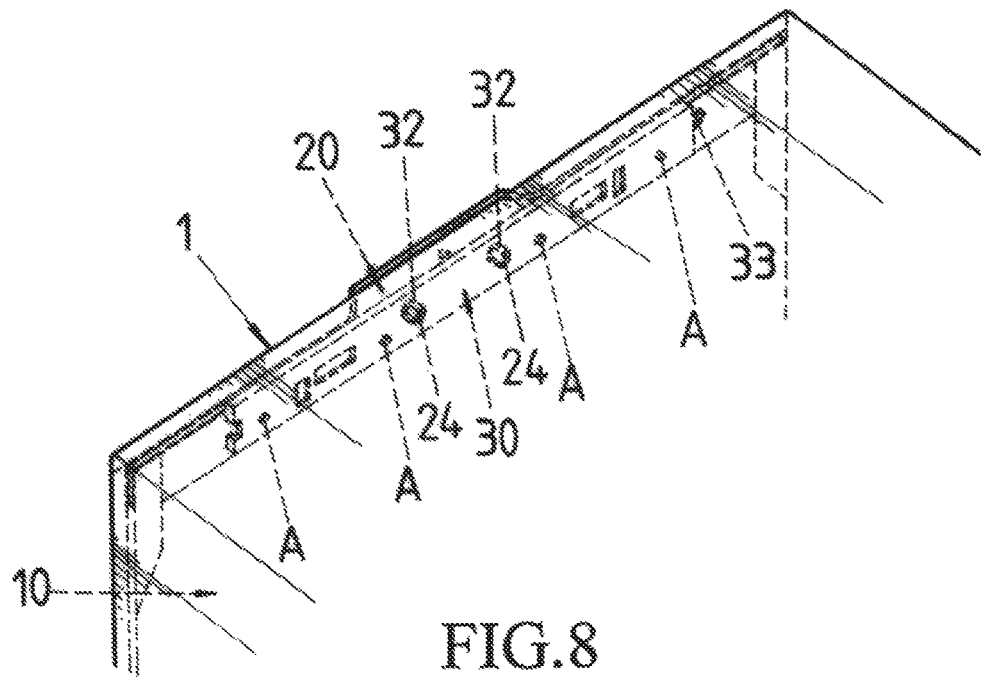
FIG. 8 shows an assembled view of a computer combined with a movable handle and a movable plate of the present invention.

Referring to FIG. 8, when the glass side panel 10 is locked on the computer 1, the two lock hooks 24 on the movable handle 20 penetrate the two perforations 103 of the computer 1 respectively and are then locked into the two through-holes 32 of the movable plate 30 for positioning.

Figure 9:
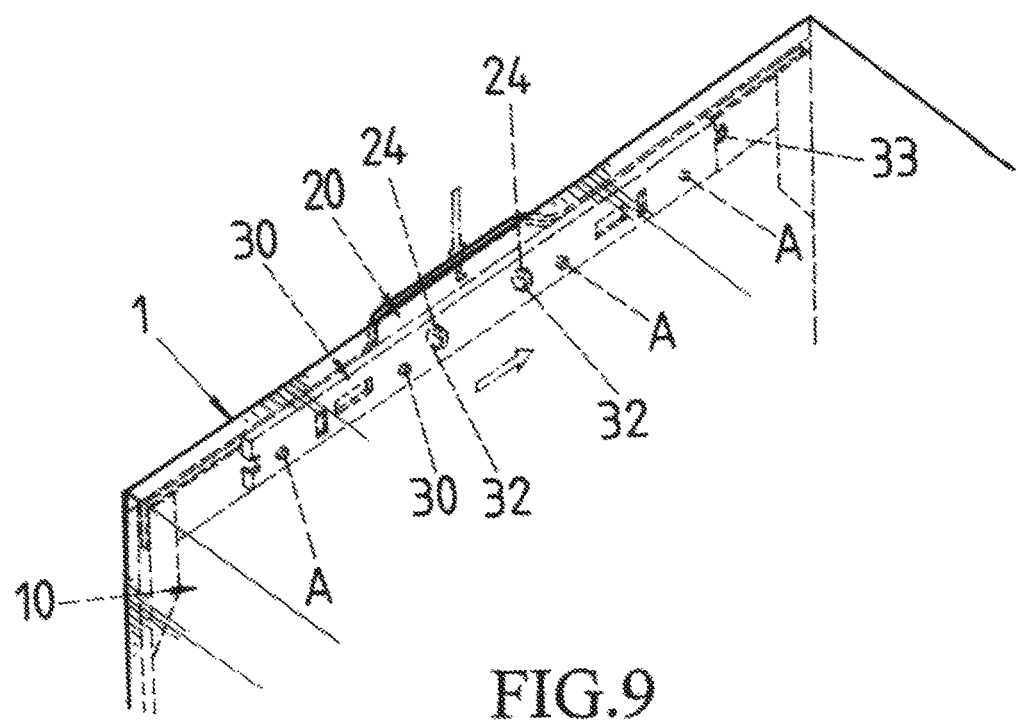
FIG. 9 shows a schematic view of an implementation upon disassembling a glass side panel when pressing movable handle of the present invention.

Referring to FIG. 9, when the glass side panel 10 is to be dismantled for repairing or replacing internal parts of the computer 1, only the movable handle 20 on the top end of the glass side panel 10 needs to be pressed, and the two lock hooks 24 will push away the two slant through-holes 32 on the movable plate 30 to displace the movable plate 30 toward a side, which loosens the lock hooks 24. As shown in FIG. 3, the glass side panel 10 will then be tilted outward and opened along a direction indicated by the arrow, thereby being dismantled from the computer 1 quickly.

In conclusion and according to the above description of the present invention, the glass side panel is locked on the computer without using screws. When the glass side panel is to be dismantled for repairing or replacing internal parts of the computer, only the movable handle on the top end of the glass side panel needs to be pressed to displace the movable plate in the computer, and then the glass side panel can be tilted outward and opened, thereby being dismantled from the computer quickly.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A tool-free fastening device for a glass side panel of computer, wherein a glass side panel on an end of a computer is latched in a bottom seat of the computer, with the present invention being characterized in that a groove is disposed near a central location on a top end of the glass side panel for putting in a movable handle, two ends of the groove are provided respectively with a lock hole, a lower side of the groove is provided with a spring hook, two ends of the movable handle are provided respectively with a lock block engaged in the lock hole of the groove for positioning, a spring hook is disposed near a central location on an interior side of the movable handle, an end of a spring is hooked on the spring hook of the movable handle, the other end of the spring is hooked on the spring hook of the glass side panel, two ends of the spring hook on an interior side of the movable handle are provided respectively with a lock hook, a top end of the computer is provided with at least a long hole and two perforations, at least a lock hole is disposed on an end of a movable plate corresponding to the long hole of the glass side panel, a screw penetrates the long hole of the computer and is then locked into the lock hole of the movable plate for positioning, two through-holes are disposed at a central location of the movable plate, a side of the movable plate is hooked with a restoring spring, the other end of the restoring spring is hooked on a hook column of the computer, the two lock hooks of the movable handle penetrate the two perforations of the computer respectively and are then locked into the two through-holes of the movable plate for positioning.

2. The tool-free fastening device for a glass side panel of computer, according to claim 1, wherein the two through-holes on the movable plate are slant and rectangular.

3. The tool-free fastening device for a glass side panel of computer, according to claim 1, wherein an upper and lower side of the glass side panel are provided with plastic elements.

* * * * *